No. 788,144. PATENTED APR. 25, 1905.
R. S. PEASE.
APPARATUS FOR THE MANUFACTURE OF GLASS.
APPLICATION FILED JULY 16, 1902.
2 SHEETS—SHEET 1.
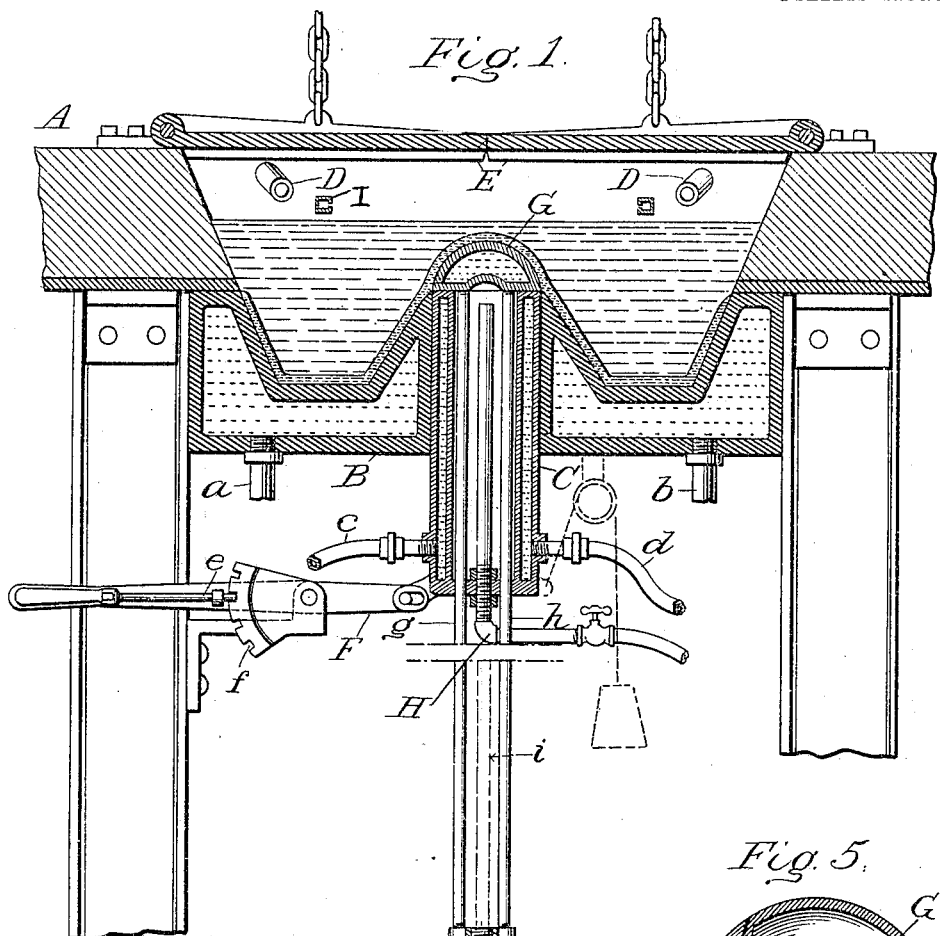
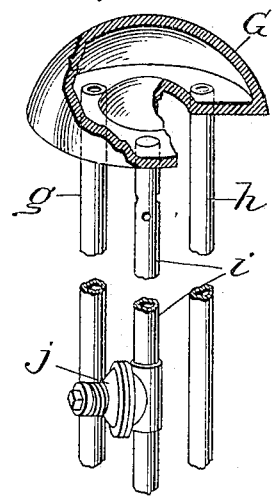

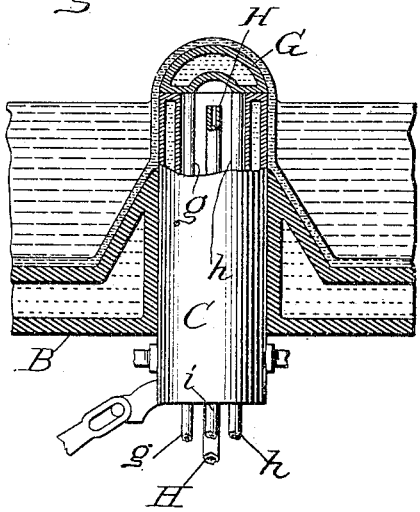
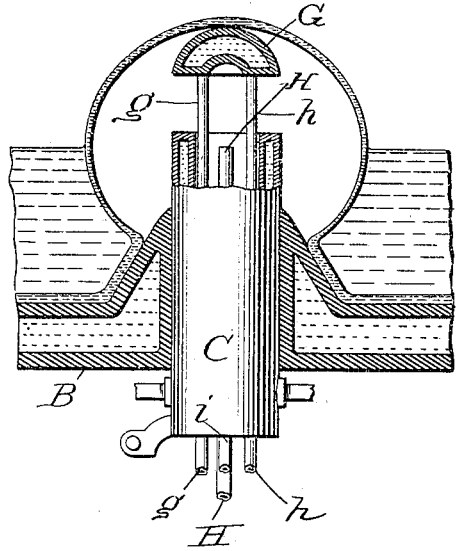
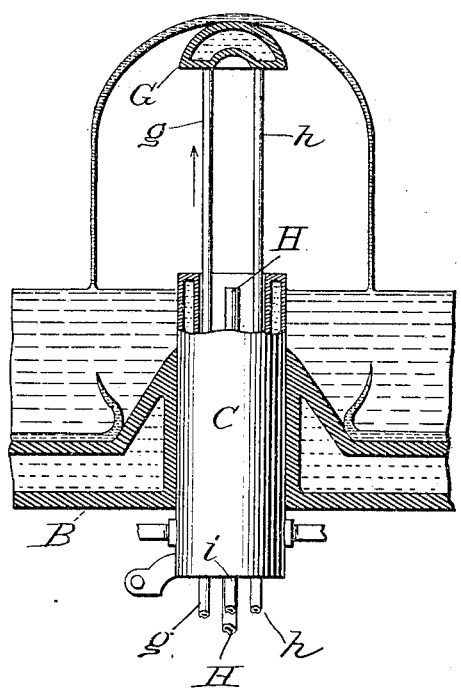

No. 788,144. Patented April 25, 1905.

UNITED STATES PATENT OFFICE.

ROGER SHERMAN PEASE, OF ROSE, MINNESOTA.

APPARATUS FOR THE MANUFACTURE OF GLASS.

SPECIFICATION forming part of Letters Patent No. 788,144, dated April 25, 1905.

Application filed July 16, 1902. Serial No. 115,861.

*To all whom it may concern:*

Be it known that I, ROGER SHERMAN PEASE, a citizen of the United States, residing at Rose, in the county of Ramsey and State of Minnesota, have invented certain new and useful Improvements in Apparatus for the Manufacture of Glass, of which the following is a specification.

This invention pertains to the manufacture of glass, and is primarily intended for the economical production of window-glass, though it may be applied to the manufacture of cylinders or tubes of any desired shape in cross-section and other forms or bodies.

The apparatus about to be described is one of a variety of forms devised by me for carrying out a novel method or art of producing glass sheets and other bodies and involves means for producing from the molten glass or metal of which the body is to be formed a bait to determine the size and thickness of the walls of the body produced. This, however, will be made more clear in the description which follows.

The invention is illustrated in simple form, unnecessary details or matters common and well understood in the art of glass-making being omitted to avoid needless elaboration.

In said drawings, Figure 1 is a sectional view of apparatus embodying my invention and showing the parts in the positions which they occupy at the moment of beginning the formation of the body; Fig. 2, a similar view, but showing the central chill, core, or cylinder and head elevated above the level of the molten glass or metal; Fig. 3, a view illustrating the formation of the bulb from which the bait is produced; Fig. 4, a view showing the head lifted to a still higher position and the bait drawing upward from the mass of molten metal a cylinder or other hollow body, and Fig. 5 a sectional perspective view of the head by which the bait is lifted and the cylinder or other body is drawn from the mass of molten metal.

In the drawings, A indicates the floor, bed, or base of a chamber, or it may be a mere table or platform having an opening through it, preferably of circular form, though the shape is not essential.

B designates a hollow-walled vessel provided with inlet and outlet pipes *a b* for the ingress and egress of water or other cooling medium. This vessel is here represented as having a raised center or boss, which form is preferred for the reason that it affords a better guide or bearing for the central core or chill C, which is arranged to fit and to slide in a vertical opening through the vessel B. The core or cylinder C is itself made hollow and provided with inlet and outlet pipes *c d*. Any convenient means may be provided for raising and lowering the core, so as to carry its upper end above or below the level of the molten glass or metal, as required. Obviously the core may be fixed and the level of the glass varied in any common and well known way to effect the same result; but a movable core is deemed the better construction. If made stationary, however, it may of course be integral with the vessel B.

Gas-burners D or other suitable means of heating the contents of vessel B may be provided, or the molten metal may be delivered to the vessel at such temperature and used so rapidly as to render further heating unnecessary. I prefer, however, to provide some means of heating, and to retain the heat covers E may be furnished.

In Fig. 1 I have shown a lever F connected with the core or chill C and provided with a locking-bolt *e* to engage a rack *f* and hold the lever, and consequently the core, at the desired adjustment. Any equivalent and well-known means for adjusting and holding the core or chill may of course be substituted for that shown.

G indicates a head, which may be of any suitable form, but is preferably of flattened dome shape, as seen in the several figures. This head is supported by one or more rods or uprights of suitable character. Preferably the supports are three in number and are of tubular form, two of them, *g* and *h*, being designed to carry water or other cooling agent or medium into and out of the head G, and the third, *i*, being closed at its upper end or against communication with the interior of head G, but perforated below said head, so that it may serve as an exit for heated air from within the cylinder or other body being drawn.

The horizontal cross-section of the core or chill C may vary as desired and according to the form of the article or body to be produced, and the head G will correspond in outline with said core or chill.

Rising centrally within the core or chill C is a pipe H, which serves for the introduction of air or other gas under pressure. To prevent the escape of air from within the body being drawn, except as it may be desired to withdraw the air from the upper part thereof under proper control, the lower end of the chill or core C is closed, but is perforated where the pipes g, h, i, and H are passed through the same.

The apparatus being constructed as above described or in substantial accordance with said description, its operation is as follows: The head G is lowered to the position indicated in Fig. 1 or to such position as shall enable the molten glass lying in or introduced into the vessel B to completely cover said head. The molten glass within or introduced into the vessel B will under this adjustment of parts and with water or other cooling agent circulating through the interior of the vessel B and head G become chilled in those portions in immediate contact with the walls of said parts. This chilling or setting will be sufficient to give to the film of glass a considerable tenacity, adapting it to be drawn and manipulated as required. After the film is thus formed, its thickness being determined by the relative temperatures of the vessel B and head G on the one hand and of the glass on the other, the core or chill C and the head G (which latter rests upon the top of the core) are elevated from the position shown in Fig. 1 to that indicated in Fig. 2 or sufficiently to carry the upper end of chill or core C slightly above the level of the glass within the vessel B. This done, the core or chill is locked in position, and immediately thereafter air or other gas under pressure is allowed to flow through pipe H under proper control or regulation. At the same time the head G is elevated slightly, so that the air may escape between said head and the upper end of core or chill C and act beneath or within the film of glass chilled or partially set and lying upon the exposed upper end of core C and head G. The result of this simultaneous elevation and introduction of air is to strip the glass film from the said parts and to expand the same in the form of a hollow bulb or globe, as indicated in Fig. 3. This operation continues until the diameter of the bulb or globe equals that of the body to be drawn or produced. The set or chilled film is gradually stripped off, not only from the core but from the central boss or raised portion of the vessel B. In other words, it assumes substantially the form indicated in Fig. 3. As the bulb is thus raised above the level of the glass in the vessel B (the cover E having been previously thrown back) it becomes completely chilled and set. It is of gradually-decreasing thickness from its highest point down to the level of the molten metal and thence increases toward the point at which it again makes contact with the chilled wall of vessel B; but as the head G rises further and the bulb remains longer out of contact with the chilling surfaces and in contact with the molten metal the thin portion of the film within the body of metal gradually melts down and allows the molten metal to flow back into contact with the chilling surfaces. The depending edge or skirt of the upper portion of the bulb (which portion now becomes a bait) remains in contact or united with the molten glass or metal in vessel B and having now a fixed diameter by reason of its setting and chilling and a fixed thickness at the point of contact it will continue to draw upward from the molten metal in vessel B a body of glass exactly conforming in outline to the outline of said bait and of a thickness of wall equal to the thickness of said skirt or depending edge of the bait. The cylinder or other body may be drawn to any length within the practical limits of elevation of the head G, contact with the atmosphere serving to promptly chill the glass and set the same. The air entering within the cylinder or other body thus drawn of course becomes rapidly heated and expands, and this expansion may be more rapid than the increase of space incident to elongation of the cylinder or other body. To guard against possible distortion of the cylinder or other body or against undue pressure within it incident to this expansion, the pipe i may be perforated, as shown in Fig. 5, so that any excess of air within the cylinder may pass out through said perforations and escape into the surrounding atmosphere. The rate of escape may be controlled by a valve of any suitable type—as, for instance, an outwardly-opening check-valve j, such as is indicated in Fig. 5. Any convenient means may be provided for elevating the head G, a hydraulic lift being represented in the drawings as a convenient and familiar means to this end. When the cylinder or body attains the desired length, it becomes necessary to separate it from the metal in the vessel B. This may be done in any of a variety of well-known ways; but I prefer to provide close to the level of the glass or metal in the vessel B a hollow ring I, communicating with a gas-supply and provided with a series of perforations or jet-openings, as shown in Fig. 1. By admitting gas to this ring and permitting it to escape through the jet-openings and to become ignited heat sufficient to melt and sever the glass at that point will be produced. The head G being slightly further elevated, any suitable support or carrier may be introduced beneath the lower end of the cylinder to sustain the same while head G is lowered clear of the cylinder, or the cylinder may be lifted from above the head without lowering the latter. It is preferred, however, to lower the same preparatory to removing the cylinder or other body. The head G and core or chill C are lowered to the initial positions (indicated in Fig. 1) preparatory to the formation of another cylinder or other body, and the above-described operations are repeated.

By this means and in this manner I am enabled to produce with great rapidity cylinders and like bodies of glass of any thickness desired and of any length within reasonable limits.

If it be desired to convert the glass into sheets or plates, the head of the cylinder will be removed and the cylinder will be slitted longitudinally, flattened, and annealed in the usual way of treating window-glass, or by making the head and core of suitable form polygonal bodies may be produced from which flat sheets may be cut without the necessity of performing the flattening operation as a distinct and separate step.

It will be observed that by my plan of operation and with the aid of the apparatus above described I produce for each cylinder or other body drawn a new bait of such shape and dimensions as may be required and that I form it out of the same metal from which the bait draws the cylinder or other body. I thus avoid any possible difference in the character of the glass constituting the bait and that of the body drawn by said bait. I also obviate the necessity of providing separate apparatus for making the bait and avoid the delay incident to such separate operation and the loss occasioned by making and storing such baits, handling them, and placing them in position in the apparatus.

It is obvious that the details of the apparatus may be greatly varied, that any known and convenient means of cooling may be employed where water or like agent is suggested, that the vessel may be made in one or in several parts and of any suitable material, that the means for elevating the head and for adjusting the chill or core may also be varied as desired, and that the general details of construction may be varied according to the requirements of any particular situation or as the judgment or fancy of the constructor may dictate or suggest.

Having thus described my invention, I claim—

1. In an apparatus for the manufacture of glass cylinders and like bodies, the combination of a vessel adapted to contain molten glass or metal; means for chilling said vessel; a core or chill within said vessel; a head on said core or chill provided with means for cooling or chilling the same; means for elevating and lowering said head; and a pipe or inlet for the admission of air or other gas under pressure beneath said head, all substantially as described.

2. In combination with a vessel adapted to contain molten glass or metal, provided with a core or chill rising above the bottom of said vessel, means for cooling said core; a head above said core; means for cooling or chilling said head; elevating devices for raising said head; and means for introducing air or other gas beneath said head, whereby, through the chilling action of the head and core, a film of glass may be chilled or set thereon, and by the elevation of said head and the introduction of air or other gas said film may be expanded to form a bait and to draw from the molten metal a cylinder or like body.

3. In an apparatus for the manufacture of glass, the combination of a vessel adapted to contain molten metal; a central core provided with means for cooling or chilling the same; a vertically-movable head above said core; a pipe for the introduction of air or other gas below said head; a support for said head comprising an inlet and an outlet pipe for the introduction and escape of water or other cooling medium; and means, substantially as described and shown, for elevating and lowering the head.

4. In an apparatus for the manufacture of glass, the combination of a vessel adapted to contain molten metal; a central core provided with means for cooling or chilling the same; a vertically-movable head above said core; a pipe for the introduction of air or other gas below said head; a support for said head comprising an inlet and an outlet pipe for the introduction and escape of water or other cooling medium, and a third pipe closed against communication with the interior of the head but perforated near its upper end to afford escape for air from within the body being drawn; and means, substantially as described and shown, for elevating and lowering the head.

5. In an apparatus for the manufacture of glass cylinders and like bodies, the combination of a vessel for containing molten glass or metal; means for chilling or partially setting a film of glass within said vessel; a head arranged to contact with the molten glass and to stand beneath the film thus produced; means for elevating said head; and means for introducing air or other gas into the hollow film.

6. In an apparatus for the manufacture of glass cylinders and like bodies, the combination of a vessel for containing molten glass or metal; means for chilling or partially setting a film of glass within said vessel; a head arranged to contact with the molten glass and to stand beneath the film thus produced; means for elevating said head; means for introducing air or other gas into the hollow film; and means for severing the cylinder or other body formed by the elevation of the head and film.

7. In an apparatus for the manufacture of glass cylinders and like bodies, the combination of a vessel for containing molten glass or metal; means for chilling or partially setting a film of glass within said vessel; a head located within said vessel and adapted to stand beneath the film thus produced; means for elevating said head; means for introducing air or other gas into the hollow film; and a severing device for said cylinder or other body consisting of an encircling hollow ring provided with a series of jet-openings and communicating with a suitable gas-supply.

8. In combination with vessel B; core or chill C; head G; pipes or conductors for supplying a cooling medium to the core C and head G; and means for elevating the head G, all substantially as described.

9. In combination with vessel B and core C; head G; pipes $g$ and $h$ communicating with the interior of said head and serving to introduce a cooling medium thereinto; pipe $i$ having an opening near its top but closed against communication with said head G; and pipe H serving to introduce air or other gas under pressure within the core C, all substantially as described.

10. In glass-drawing apparatus a vessel arranged to contain molten glass; a core within the vessel, means for chilling a film and elevating it above the core, and means for expanding said film; substantially as described.

11. In apparatus for drawing glass, a receptacle for molten glass, a core, means for forming a film on the core within the glass and means for expanding the film so that it may be used as a bait; substantially as described.

In testimony whereof I have signed my name to this specification in the presence of two subscribing witnesses.

ROGER SHERMAN PEASE.

Witnesses:
UPTON H. RIDENOUR, Jr.,
HORACE A. DODGE.